May 2, 1961 M. E. SIMMONS ET AL 2,982,873
DYNAMO ELECTRIC MACHINE
Filed June 24, 1957 2 Sheets-Sheet 1
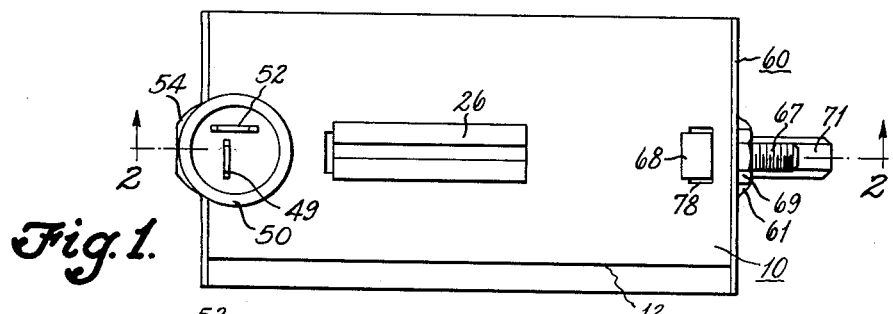
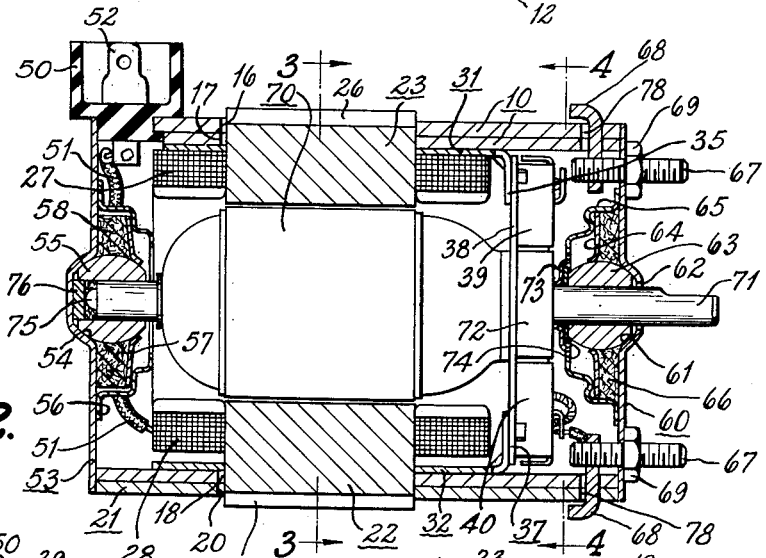
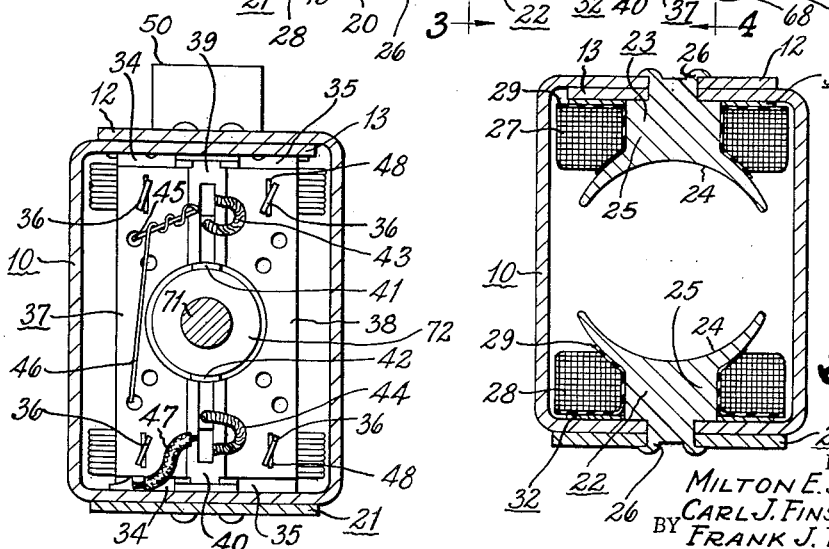
INVENTORS
MILTON E. SIMMONS
CARL J. FINSTERWALDER
FRANK J. TERKOSKI
BY
M. H. Strickland
ATTORNEY May 2, 1961 M. E. SIMMONS ET AL 2,982,873
DYNAMO ELECTRIC MACHINE
Filed June 24, 1957 2 Sheets-Sheet 2

INVENTORS
MILTON E. SIMMONS
CARL J. FINSTERWALDER
BY FRANK J. TERKOSKI
J. H. Strickland
ATTORNEY

United States Patent Office 2,982,873
Patented May 2, 1961

2,982,873

DYNAMO ELECTRIC MACHINE

Milton E. Simmons, Carl J. Finsterwalder, and Frank J. Terkoski, Rochester, N.Y., assignors to General Motors Corporation, Detroit, Mich., a corporation of Delaware Filed June 24, 1957, Ser. No. 667,418

8 Claims. (Cl. 310—258)

This invention pertains to dynamo electric machines, and particularly to small direct current electric motors.

Heretofore, it has been customary in the manufacture of small direct current electric motors to construct the field core from a plurality of sheet metal laminations, each lamination having a pair of integral pole formations extending inwardly therefrom. The laminations are assembled in stacked relation and secured together by any suitable means, such as by welding. The pole formations are encircled by field windings, and the field assembly is enclosed by a casing comprising a pair of cup-shaped members having bearings for rotatably supporting an armature. The present invention relates to an improved motor assembly wherein the pole assemblies are designed to interconnect a two-part frame assembly having end caps attached thereto which rotatably support an armature. Accordingly, among our objects are the provision of a dynamo electric machine including a pair of frame members which are secured in assembled relation by a pair of pole assemblies; the further provision of a commutator type motor including a pair of channel-shaped frame members which are secured in assembled relation by a pair of pole assemblies having means for supporting a brush holder assembly; and the still further provision of a rectangular electric motor assembly having means for removably securing the commutator end cap to the motor frame.

The aforementioned and other objects are accomplished in the present invention by providing the pole assemblies with deformable lug means for holding the two halves of the frame in assembled relation. Specifically, two embodiments of the improved motor assembly are disclosed herein. In one embodiment, the frame comprises a pair of channel-shaped members of magnetic material, each member having a slot of predetermined longitudinal extent in the leg portions thereof. The two channel-shaped members are arranged with the channeled portions facing each other with the ends of the legs abutting. The channel-shaped members are maintained in assembled relation to form a frame by a pair of opposed pole assemblies, each pole assembly comprising a plurality of sheet metal laminae. Each lamina is formed with an arcuate pole shoe formation, a body portion, a flange portion and a pair of upstanding bifurcated lugs, the lugs extending through the slots in the channel-shaped frame members and are swedged thereover to maintain the frame members in assembled relation.

The several laminae of each pole piece assembly are welded together, and the body portion thereof is encircled by a field coil. A metal bracket is interposed between the flange portion of each pole assembly and the inner wall of the flange, each bracket having a pair of tangs extending inwardly therefrom to which a brush holder plate is attached. In both embodiments, one end of the frame is closed by an end cap which is projection welded thereto. This end cap supports a self-aligning bearing assembly within which one end of the armature shaft is rotatably journalled. The other end of the armature shaft is rotatably journalled in a commutator end cap assembly which is removably secured to the other end of the frame assembly. The commutator end cap assembly is secured to the frame assembly by a pair of studs having L-shaped nuts which extend through slots in the frame assembly.

In the preferred embodiment, the frame comprises a single strip of sheet metal formed into a box-like structure of rectangular shape having overlapping end portions on one side and a plate overlying the opposite side. The overlapping ends and the opposite side of the frame and the plate are formed with aligned slots of predetermined longitudinal extent. In this embodiment the pole assemblies are composed of a solid piece of magnetic material having a pole shoe formation, a pole body formation and a bifurcated lug. The bifurcated lug of one pole assembly extends through the aligned slots in the overlapping end portions and the bifurcated lug of the other pole assembly extends through the aligned slots in the opposite side of the frame and the overlying plate. The lugs are swedged thereover to maintain the frame members in assembled relation. Each pole assembly is encircled by a field coil assembly, and the brush holder bracket is interposed between each field coil assembly and the inner wall of the frame assembly.

Further objects and advantages of the present invention will be apparent from the following description, reference being had to the accompanying drawings, wherein preferred embodiments of the present invention are clearly shown.

In the drawings:

Figure 1 is a view in elevation of a motor constructed according to the preferred embodiment of this invention.

Figure 2 is a longitudinal sectional view taken along line 2—2 of Figure 1.

Figure 3 is a sectional view taken along line 3—3 of Figure 2 with certain parts removed.

Figure 4 is a sectional view taken along line 4—4 of Figure 2.

Figure 5:
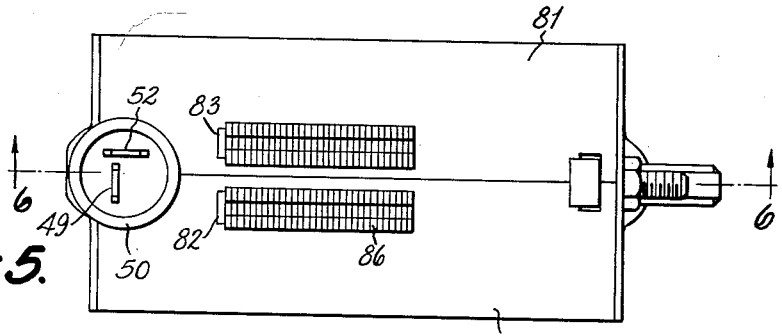
Figure 5 is a view in elevation of a motor constructed according to the second embodiment of this invention.

With particular reference to Figures 1 through 4, in the preferred embodiment the motor comprises a steel frame composed of a single steel strip member 10 formed into a box-like structure having open ends and overlapping end portions 12 and 13, respectively, on one side. The frame is of substantially rectangular configuration as shown in Figures 3 and 4, and the overlapping end portions 12 and 13 have aligned longitudinally extending slots 16 and 17, respectively. The side opposite the overlapping end portions has a longitudinally extending slot 18 which is aligned with a slot 20 in a plate member 21 which is placed thereover to improve the flux distribution.

The two parts of the motor frame comprising the box 10 and the plate 21 are held in assembled relation by a pair of pole assemblies 22 and 23. As seen in Figures 2 and 3, the solid pole assemblies 22 and 23, which are of identical construction, include integral pole shoe formations 24, pole body formations 25 and bifurcated lugs 26. The bifurcated lug 26 of the pole 23 extends through the aligned slots 16 and 17 in the overlapping end portions 12 and 13, respectively, of the frame member 10. The lug 26 of the pole 22 extends through the slot 18 in the frame member 10 and the slot 20 in the plate 21. The lugs 26 are swedged, or otherwise upset, to secure the two parts of the frame in assembled relation.

Prior to securing the poles 22 and 23 to the frame members 10 and 21, field coil windings 27 and 28 are wound about the body formations 25 of the poles, a suitable liner 29 of insulating material being wrapped about the poles prior to winding. Thereafter, a metallic brush holder bracket 31 is placed on top of the field coil 27, and a similar bracket 32 is placed on top of the field coil 28. The brackets 31 and 32 are formed with pairs of inwardly extending flanges 34 and 35, each flange portion of both brackets having a tang 36 extending axially therefrom. The tangs 36 are arranged to support a brush holder assembly generally depicted by the numeral 37.

The brush holder assembly 37 includes a plate 38 of insulating material supporting a pair of brush guides 39 and 40. The brush guides 39 and 40 slideably receive spring biased brushes 41 and 42, respectively, having pigtails 43 and 44. The pigtail 43 is suitably connected to the brush guide 39, and one of the lead wires 45 from the field coil 27 and one of the lead wires 46 from the field coil 28 are also connected to the brush guide 39. The pigtail 44 is connected to the brush guide 40, the brush guide 40 being connected to the motor frame by a wire 47. The brush holder plate 38 is formed with apertures 48 through which tangs 36 extend. The tangs 36 are twisted, as shown, to secure the brush holder assembly in position.

The other lead wire, not shown, from the field coil 27 is connected to a terminal 49 supported by a grommet 50. The other lead wire 51 from the coil 28 is attached to terminal 52 supported by the grommet 50. The motor is of the split series reversible type, and thus both of the field coils 27 and 28 constitute series field windings.

One end of the frame is closed by an end plate 53 which is permanently attached to the frame by any suitable means, such as projection welding. The end plate 53 is formed with an integral depression having a spherical surface 54 for supporting a self-aligning bearing 55. The end plate 53 has attached thereto a slinger shield 56 which supports a resilient bearing retainer 57. A suitable felt packing 58 impregnated with lubricant is interposed between the bearing retainer 57 and the end plate 53, as shown in Figure 2.

The other end of the frame is closed by a commutator end plate 60 having a depression therein with a spherical surface 61 and a central aperture 62. A second self-aligning bearing 63 is supported by the end plate 60 and a bearing retainer 64 carried by a slinger shield 65 attached to the end plate 60. An impregnated felt packing 66 is interposed between the bearing retainer 64 and the end plate 60. The end plate 60 is removably secured to the frame by a pair of studs 67 which threadedly engage L-shaped nuts 68 that extend through slots 78 in the frame. The studs 67 also receive nuts 69 which clamp the commutator end plate 60 against the motor frame.

An armature 70 of conventional construction has a shaft 71 rotatably supported in spaced self-aligning bearings 55 and 63. The armature 70 includes a commutator 72 which is engaged by the brushes 41 and 42. In addition, one end of the shaft 71 extends through the central aperture 62 in the commutator end plate 60, and has an oil slinger 73 attached thereto. One or more thrust washers 74 are interposed between the oil slinger 73 and the self-aligning bearing 63 as shown in Figure 2. The other end of the armature shaft 71 has a ball 75 fitted therein which engages a disc 76 for sustaining the armature thrust.

Figure 6:
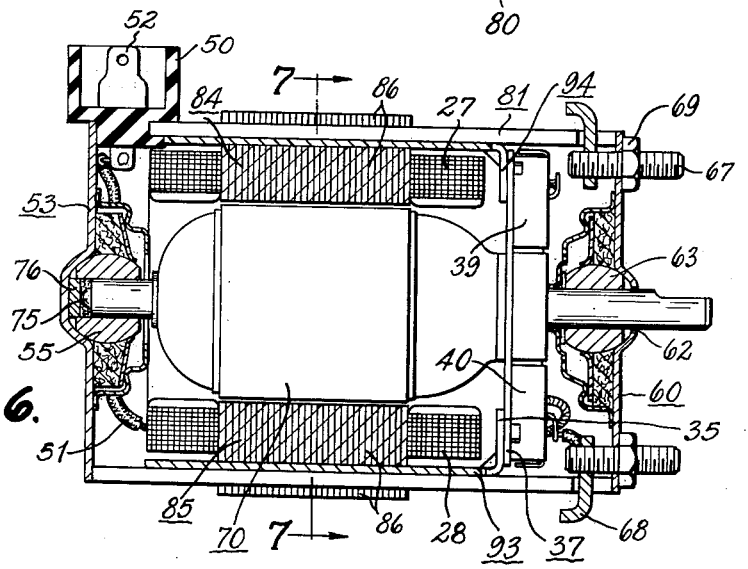
Figure 6 is a longitudinal sectional view taken along line 6—6 of Figure 5.
Figure 7:
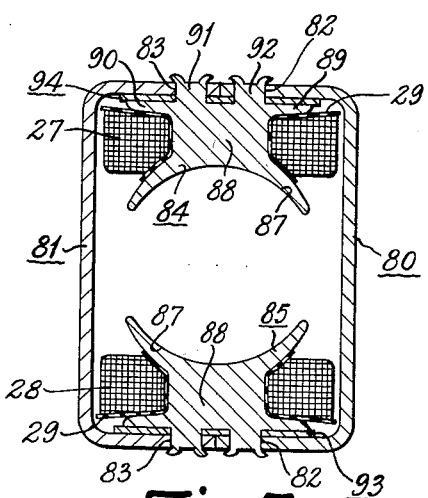
Figure 7 is a sectional view taken along line 7—7 of Figure 6 with certain parts removed.

With particular reference to Figures 5 through 7, a modified embodiment of a rectangular electric motor constructed according to this invention will be described, similar numerals depicting similar parts throughout the several views. In the modified embodiment, the sheet metal frame comprises a pair of metal members 80 and 81 of channel shape, with the leg portions of both channel-shaped members abutting each other. The leg portions of both channel-shaped members have longitudinally extending slots 82 and 83, respectively, spaced from the marginal edges thereof. Moreover, in the modified embodiment, the pole assemblies 84 and 85 comprise a plurality of sheet metal laminations 86. As seen in Figure 7, each lamination is formed with an arcuate pole shoe formation 87, a body formation 88, a pair of flanges 89 and 90 and a pair of bifurcated legs 91 and 92. The laminations 86 comprising the pole pieces 84 and 85 may be secured in stacked relation by any suitable means, such as by welding.

The field coil windings 27 and 28 are wound about the stacked laminations with an insulating liner 29 interposed between the windings and the pole assemblies. After the coils have been wound on the pole assemblies, brush holder brackets 93 and 94, similar to the brackets 31 and 32 except for the slots through which lugs 91 and 92 extend, are placed on top of the flanges 89 and 90, and the lugs 91 and 92 are inserted through the slots 82 and 83 of the frame members 80 and 81. The lugs 91 and 92 are swedged thereover so as to attach the field coil and pole assemblies to the frame and secure the two parts of the frame in assembled relation. The remaining components of the motor disclosed in Figures 5 through 7 are identical with the components hereinbefore described in the preferred embodiment.

From the foregoing it is apparent that the present invention provides a two pole motor assembly of substantially rectangular configuration which lends itself to the economical manufacture of small direct current motors.

While the embodiments of the present invention as herein disclosed constitute preferred forms, it is to be understood that other forms might be adopted, as may come within the scope of the claims which follow.

What is claimed is as follows:

1. An electric motor assembly including; a pair of channel-shaped sheet metal members arranged with the channeled portions facing each other, a pair of opposed pole assemblies attached to said members and securing said members in assembled relation to form a frame, a pair of end caps secured to said frame, an armature assembly rotatably supported in said end caps and having a commutator, a pair of field coil assemblies carried by said pole assemblies, a pair of brackets clamped between said field pole assemblies and said frame by the attachment of the pole assemblies to said sheet metal members, and a brush holder assembly carried by said brackets and having brushes engaging said commutator.

2. An electric motor including, a pair of channel-shaped sheet metal members arranged with the channeled portions facing each other, the leg portions of each channel-shaped member having longitudinally extending slots therein of predetermined length, a pair of opposed pole assemblies having lug means extending through said slots and swedged thereover for securing the channel-shaped members in assembled relation to form a frame, a pair of end caps secured to said frame, an armature assembly rotatably supported in said end caps and having a commutator, a pair of field coil assemblies carried by said pole assemblies, a pair of brackets clamped between said pole assemblies and said frame by the attachment of pole assemblies to said sheet metal members, and a brush holder assembly attached to said brackets and having brushes engaging said commutator.

3. In a dynamo electric machine, a pair of channel-shaped sheet metal members arranged with the channeled portions facing each other to form a box-like structure with open ends and contiguous leg portions, each member having a slot of predetermined longitudinal extent in the contiguous leg portions thereof, a pair of opposed pole assemblies having lug means extending through the slots in said members and deformed thereover for securing the members in assembled relation to form a frame, and a brush holder bracket clamped between each pole assembly and said frame by the attachment of each pole assembly to said sheet metal members.

4. In a dynamo electric machine, a pair of channel-shaped sheet metal members arranged with the channeled portions facing each other to form a box-like structure with open ends and contiguous leg portions, each member having a slot of predetermined longitudinal extent in the contiguous leg portions thereof, a pair of opposed pole assemblies having lug means extending through the slots in said members and deformed thereover to secure the members in assembled relation to form a frame, a pair of brackets clamped between said pole assemblies and said frame by the attachment of the pole assemblies to said sheet metal members, said brackets having inwardly extending flanged portions, and a brush holder assembly attached to the inwardly extending flanged portions of said brackets.

5. In a dynamo electric machine, a box-like sheet metal structure having open ends and contiguous portions, a pair of opposed pole assemblies attached to the contiguous portions of said sheet metal structure for securing the contiguous portions together and maintaining said structure in assembled relation to form a frame, a pair of brackets clamped between said pole assemblies and said frame by the attachment of the pole assemblies to said sheet metal structure, said brackets having inwardly extending flanged portions, and a brush holder assembly attached to the inwardly extending flanged portions of said brackets.

6. In a dynamo electric machine, a box-like sheet metal structure having open ends comprising a single piece of sheet metal having overlapping end portions on one side and a plate member overlying the opposite side, a pair of opposed pole assemblies attached to said overlapping end portions and the opposite side and said plate member of said sheet metal structure securing said sheet metal structure in assembled relation to form a frame, a pair of brackets clamped between said pole assemblies and said frame by the attachment of said pole assemblies to said sheet metal structure, said brackets having inwardly extending flanged portions, and a brush holder assembly attached to the inwardly extending flanged portions of said brackets.

7. The combination set forth in claim 6 wherein said overlapping end portions have aligned slots therein, the opposite side of said sheet metal member and said plate member having aligned slots, and wherein said pole assemblies have lug means extending through said slots and deformed thereover to secure the members in assembled relation.

8. In a dynamo electric machine, a box-like sheet metal structure having open ends comprising a pair of channel-shaped sheet metal members having abutting leg portions, each leg portion having a slot therein spaced from the marginal edge thereof, a pair of opposed pole assemblies, each pole assembly having a pair of lugs, one lug of each pole assembly extending through one of said slots and deformed thereover to secure said channel-shaped members in assembled relation to form a frame, a pair of brackets clamped between said pole assemblies and said frame by the attachment of said pole assemblies to said sheet metal structure, said brackets having inwardly extending flanged portions, and a brush holder assembly attached to the inwardly extending flanged portions of said brackets.

References Cited in the file of this patent

UNITED STATES PATENTS

| | | |
|---|---|---|
| 518,768 | Riker | Apr. 24, 1894 |
| 1,306,018 | Moses | June 10, 1919 |
| 1,641,548 | Oswald | Sept. 6, 1927 |
| 1,655,286 | Nietsche | Jan. 3, 1928 |
| 1,721,419 | Staak | July 16, 1929 |
| 2,235,807 | Ballman | Mar. 18, 1941 |
| 2,722,618 | Dochterman | Nov. 1, 1955 |
| 2,763,800 | Curley | Sept. 18, 1956 |
| 2,764,802 | Feiertag | Oct. 2, 1956 |
| 2,780,744 | Carneck | Feb. 5, 1957 |

FOREIGN PATENTS

| | | |
|---|---|---|
| 584,182 | France | Nov. 14, 1924 |
| 603,604 | Germany | Oct. 6, 1934 |
| 746,360 | Germany | July 21, 1944 |
| 749,839 | Great Britain | June 6, 1956 |